UNITED STATES PATENT OFFICE.

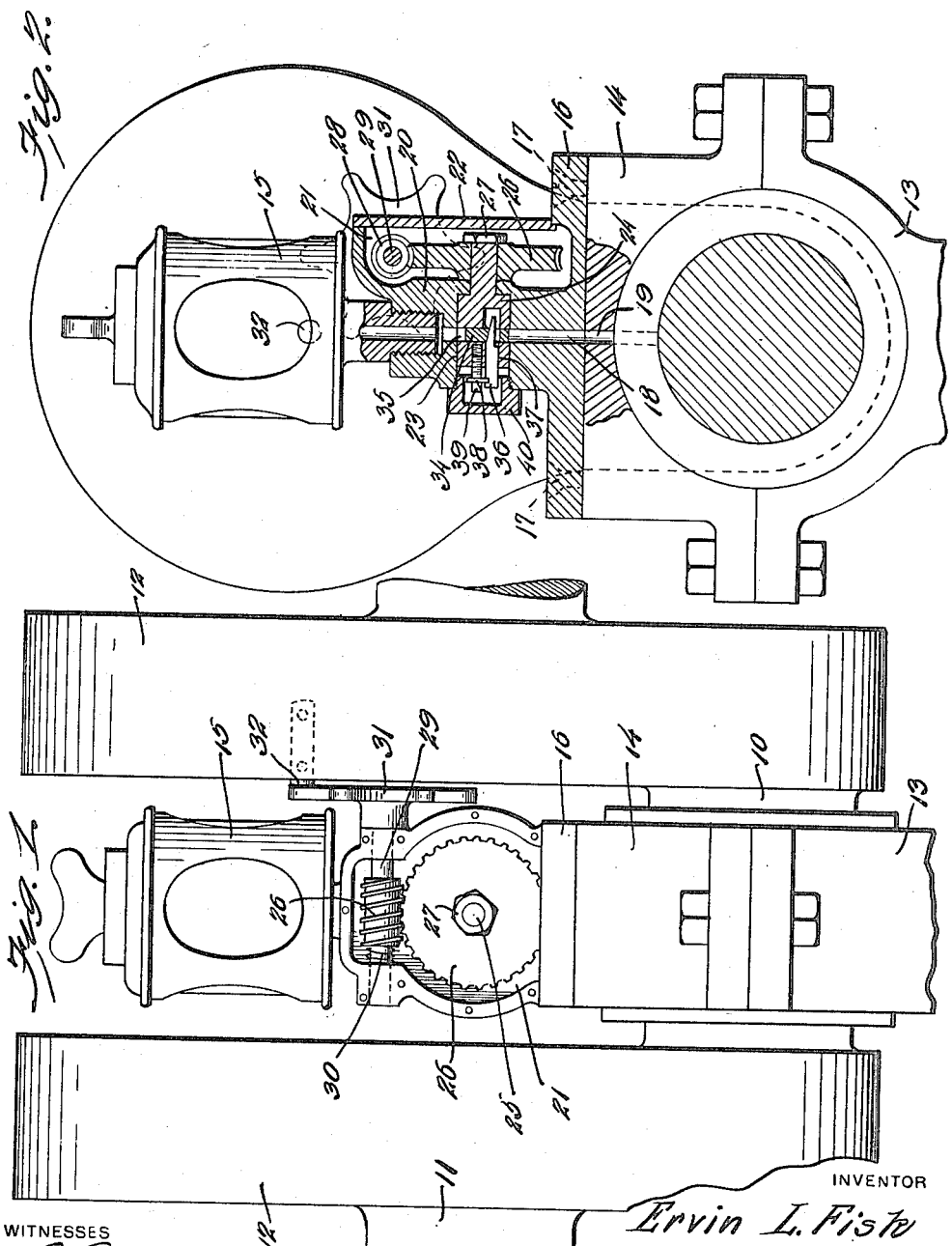

ERVIN LEE FISK, OF WELLS BRIDGE, NEW YORK.

AUTOMATIC CRANK-PIN OILER.

1,283,130.

Specification of Letters Patent.　Patented Oct. 29, 1918.

Application filed November 23, 1917.　Serial No. 203,592.

*To all whom it may concern:*

Be it known that I, ERVIN L. FISK, a citizen of the United States, residing at Wells Bridge, in the county of Otsego and State of New York, have invented certain new and useful Improvements in Automatic Crank-Pin Oilers, of which the following is a specification.

This invention relates to an improved lubricant feeding device and the principal object of the invention is to provide a lubricant feeding device so constructed that the flow of lubricant from an oil cup to the point of use may be controlled with relation to the speed of rotation of the engine or other piece of machinery and to further so construct this device that the lubricant may be fed in measured quantities, which quantities may be varied according to the desires of the operator.

Another object of the invention is to so construct this device that when set, the feeding mechanism will have no tendency to move from the adjusted position.

Another object of the invention is to so construct this device that operation thereof may be controlled from one of the fly-wheels of the engine.

This invention is illustrated in the accompanying drawings, wherein:—

Figure 1 is a view showing a portion of an engine or other piece of machinery in side elevation with the improved lubricating device connected with the same, and Fig. 2 is a vertical sectional view through the structure shown in Fig. 1, This lubricating device has been shown in connection with the crank pin 10 of a shaft 11, the crank pin being positioned between the disks or arms 12 and the pitman 13 being loosely mounted upon the crank pin 10 and held in place by the cap 14 of the bearing formed at the end of the pitman.

The speed controlling device is positioned between the oil cups 15 and the cap 14 and is provided with a base 16 by bolts or other removable fasteners 17 and provided with an oil passage 18 registering with the oil passage 19 formed in the cap 14. This base carries a standard 20 having a gear housing 21 at one side closed by the removable cover plate 22 and communicating with a passage 23 intersecting the lubricant passage 18.

Within the passage-way 23 there is provided a rotary valve plug 24 for the gear housing 21 and having a gear wheel 26 held in place by the securing nut 27 and engaged by the worm 28 mounted upon the stem or shaft 29. A spring 30 is mounted upon one end portion of this shaft 29 which engages the worm to prevent undue rotation of the shaft 29 through frictional engagement with the worm 28 and one of the bearings of the shaft. Upon the outer end portion of this shaft 29, there is mounted a ratchet wheel 31 positioned for engagement by the pin 32 carried by one of the crank arms 12 of the shaft 11. It will thus be seen that as this shaft 11 is rotated, the ratchet wheel 31 will be brought into engagement with the pins 32, one for each revolution of the crank shaft 11 and that therefore the shaft 29 will be gradually rotated and through the means of the worm 28, rotation transmitted to the valve plug 24. A passage 33 extends transversely through the valve plug 24 and carries a slidably mounted plug 34 thus providing an oil pocket 35, the depth of which will be controlled by adjustment of the clutch 34. A cam pin 36 is slidably mounted in a pocket 37 and having its inner end portion extending through an opening formed in the plug 34. In the outer end portion of this pin 36, there is provided a notch into which fits the collar 38 of the adjusting screw 39 and it will be readily seen from an inspection of Fig. 2 that when the adjusting screw is turned and moved inwardly or outwardly according to the direction of turning, the cam pin will be moved longitudinally and thus the plug raised or lowered in the passage 33 to vary the size of the oil pocket 35. When the valve plug is in the position shown in Fig. 2, the oil or other lubricant from the oil cup 15 will flow into the oil pocket or valve plug and upon this plug being rotated to bring the pocket into alinement with the oil passage 18 of the base, the oil will flow through the registering oil passages 18 and 24 to lubricate the crank pin 10. If the proper amount of oil is not feeding, the cap 40 will be removed and the screw 39 turned to move the cam pin 36 inwardly or outwardly thus raising or lowering the plug to increase or decrease the amount of oil contained in the pocket 35. It will thus be seen that there has been provided a very efficient means for controlling the passage of oil from the oil cup 15 to the crank pin 10 of the crank shaft 11, the quantity of oil being controlled and feeding of the oil being regulated by the rotation of the crank shaft.

What is claimed is:—

1. An oil feeding device comprising a base, a standard carried by the base and provided with an oil passage extending through the passage, the standard being provided with a gear housing and with a passage leading from the gear housing to the standard and intersecting the oil passage thereof, a valve plug rotatably mounted in the passage of the standard and provided with a passage for registering with the oil passage leading through the standard and base, a stem extending from the valve plug into the gear housing, a plug slidably mounted in the oil passage of the valve plug to provide an oil pocket in the upper end portion of the oil passage, and being provided with a transversely extending opening adjacent its lower end, a cam pin slidably mounted in the valve plug and slidable through the transverse opening of the adjustable plug, means for adjusting the cam pin, and means in the gear housing for imparting rotary movement to the valve plug.

2. An oil feeding device comprising a base, a standard carried by the base and provided with a longitudinal oil passage and with a transversely extending passage intersecting the oil passage, a valve head rotatably mounted in the transversely extending passage and provided with an oil passage for registering with the oil passage of the standard, the valve head being provided with a pocket intersecting the oil passage, a plug slidably mounted in the oil passage of the valve head to provide an oil pocket in one end thereof of variable depth, a cam pin slidably mounted in the valve head and slidable through an opening formed in the plug to support the plug in an adjusted position, means for imparting movement to the cam pin, and holding the cam pin in an adjusted position, and means for imparting rotary movement to the valve head.

3. An oil feeding device comprising a body having an oil passage formed therein and provided with a transversely extending passage intersecting the oil passage and constituting a valve chamber, a valve head rotatably mounted in the valve chamber, and provided with an oil passage, a plug slidably mounted in the oil passage of the valve head, a cam pin slidably mounted in the valve head and passing through an opening formed in the plug, the pin being provided with a notch adjacent its outer end, an adjusting screw carried by the valve head and provided with a collar fitting in the notch of the cam pin, and means for rotating the valve head.

In testimony whereof I affix my signature in presence of two witnesses.

ERVIN LEE FISK.

Witnesses:
 EDGAR L. BEALE,
 FLOYD R. WATERMAN.

Copies of this patent may be obtained for five cents each, by addressing the "Commissioner of Patents, Washington, D. C."